US008368666B2

(12) United States Patent
Rubinstein et al.

(10) Patent No.: US 8,368,666 B2
(45) Date of Patent: Feb. 5, 2013

(54) METHOD AND APPARATUS FOR INTERPRETING INPUT MOVEMENT ON A COMPUTING DEVICE INTERFACE AS A ONE- OR TWO-DIMENSIONAL INPUT

(75) Inventors: Jonathan J. Rubinstein, San Francisco, CA (US); Matias Duarte, Sunnyvale, CA (US); Robert Tsuk, Cupertino, CA (US); Daniel Shiplacoff, Los Angeles, CA (US); Richard Dellinger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/587,565

(22) Filed: Aug. 16, 2012

(65) Prior Publication Data
US 2012/0313878 A1  Dec. 13, 2012

Related U.S. Application Data

(63) Continuation of application No. 12/545,038, filed on Aug. 20, 2009, now Pat. No. 8,269,737.

(51) Int. Cl.
*G06F 3/041* (2006.01)
(52) U.S. Cl. ........................................ 345/173

(58) Field of Classification Search ................. None
See application file for complete search history.

(56) References Cited

U.S. PATENT DOCUMENTS

| 6,426,745 | B1 | 7/2002 | Isaacs et al. |
|---|---|---|---|
| 7,184,020 | B2 | 2/2007 | Matsui |
| 7,616,195 | B2 | 11/2009 | Sachs |
| 2003/0038789 | A1 | 2/2003 | Nakazawa et al. |
| 2004/0130524 | A1 | 7/2004 | Matsui |
| 2005/0168443 | A1 | 8/2005 | Ausbeck, Jr. |
| 2006/0055672 | A1 | 3/2006 | Krocker et al. |
| 2006/0125801 | A1 | 6/2006 | Hsu et al. |
| 2006/0232563 | A1 | 10/2006 | Lii et al. |
| 2006/0250372 | A1 | 11/2006 | Lii |
| 2009/0122020 | A1 | 5/2009 | Eliasson et al. |
| 2009/0245569 | A1 | 10/2009 | Egger et al. |
| 2010/0079411 | A1 | 4/2010 | Lee et al. |
| 2011/0043456 | A1 | 2/2011 | Rubinstein et al. |
| 2011/0134077 | A1 | 6/2011 | Chen et al. |

OTHER PUBLICATIONS

Notice of Allowance mailed Jun. 18, 2012, for related U.S. Appl. No. 12/545,038, filed Aug. 20, 2009.

*Primary Examiner* — Peter Vincent Agustin
(74) *Attorney, Agent, or Firm* — Mahamedi Paradice Kreisman LLP; Van Mahamedi

(57) ABSTRACT

A computing device is capable of intelligently interpreting input movement. The computing device detects a movement of a finger or object over an input interface. The movement is interpreted as one-dimensional or two-dimensional.

15 Claims, 7 Drawing Sheets

METHOD AND APPARATUS FOR INTERPRETING INPUT MOVEMENT ON A COMPUTING DEVICE INTERFACE AS A ONE- OR TWO-DIMENSIONAL INPUT

CROSS-REFERENCE TO RELATED APPLICATIONS

This application is a Continuation of U.S. patent application Ser. No. 12/545,038, filed Aug. 20, 2009, now U.S. Pat. No. 8,269,737 entitled "METHOD AND APPARATUS FOR INTERPRETING INPUT MOVEMENT ON A COMPUTING DEVICE INTERFACE AS A ONE- OR TWO-DIMENSIONAL INPUT", which is incorporated herein by reference in its entirety.

TECHNICAL FIELD

The disclosed embodiments relate to computing devices and user-interfaces for such devices. In particular, embodiments described herein provide a method and apparatus for interpreting input movement on a computing device interface as a one- or two-dimensional input.

BACKGROUND

Computing devices, particularly mobile computing devices and other small form-factor computing devices, often require heavy use of scroll input from a user. Generally, scroll input allows for users to linearly navigate the display of content on a computing device. In mobile computing devices, for example, much of the user's actions are centered about selecting and viewing data or content. Lists, such as those that comprise contact records or messages, are examples of computing device content that is typically scrollable in north/south (and sometimes east/west) directions in order to enable the user to scan and view numerous records with ease.

DETAILED DESCRIPTION

Figure 1:
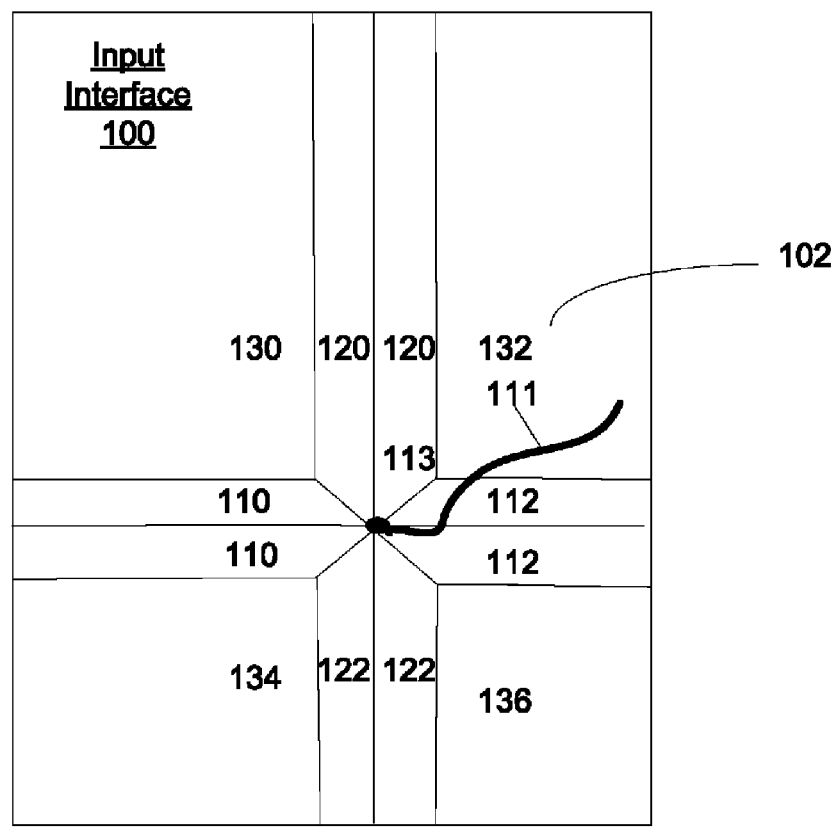
FIG. 1 illustrates a topology for enabling a computing device to determine whether continuous movement of a user's finger or object over an input interface is to be determined as one-dimensional or two-dimensional input, according to embodiments.

Embodiments described herein provide for a computing device (or computer-implemented method) by which user's input movements, typically made by a user moving a finger or object over an input interface, are intelligently interpreted as being one of a one- or two-dimensional input. By intelligently interpreting the input movement, the computing device is able to respond quickly to perform the operation that the user intends with the input movement (e.g. scrolling or gesturing).

With some computing devices, a user's input movements are entered through finger or object movements that are imprecise as compared to the ideal input movement. With linear scrolling, for example, a user may intend to swipe a finger vertically or horizontally, but in actuality, the user's motion may bend or wander. On some occasions, the user may initiate a particular input movement with stray or inadvertent contact movement. Embodiments described herein intelligently interpret a user's input movement (as made on an input interface with finger or object) as being one- or two-dimensional. In particular, some embodiments assume that a user intends to enter one-dimensional input, and subsequently enable the input to be determined as two-dimensional.

According to embodiments, a computing device includes an input interface and one or more processors. The input interface is configured to receive a finger or object movement as input from a user. The one or more processors are configured to detect a user moving the finger or object over the input interface. Position information is determined about the finger or object at multiple instances.

In accordance with another embodiment, a computing device is capable of intelligently interpreting input movement corresponding to a movement of a finger or object over an input interface.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a topology for enabling a computing device to determine whether continuous movement of a user's finger or object over an input interface is to be determined as one-dimensional or two-dimensional input, according to embodiments. With reference to FIG. 1, a topology is defined for an input interface 100 that corresponds to, for example, a touch-sensitive display surface. The topology 102 may correspond to, for example, a computer-generated model that reflects visually the manner in which an input movement 111 is interpreted by the computing device. As examples, a user's finger motion may correspond to a quick swipe, gesture, or meandering trace. Often user's enter scroll input to skip through entries in linear fashion (e.g. scroll through lists, flick through images). Two-dimensional input, on the other hand, may be used to enter a command (e.g. gesture), make a trace, view contents of a page etc. According to embodiments described, the position of the finger or object at a given instance in making the input movement is used to determine whether the input movement is one-dimensional (and if so, in what direction) or two-dimensional. The topology 102 includes horizontal input regions 110, 112 (reflecting leftward or rightward finger movements), vertical input regions 120, 122, (reflecting upward or downward finger movements), and two-dimensional quadrants 130, 132, 134 and 136. When a user's finger movement 111 is detected, one embodiment provides that the topology is determined from an initial point 113. Subsequently sampled points are determined as being horizontal/linear (left or right), vertical/linear (up or down), or two-dimensional, depending on the position of the sampled point relative to the topography. The precise configuration of the topology may be varied, depending on the implementation.

As shown, a computing device may initially interpret a user's finger movement as one-dimensional, but depending on the position of subsequent samples points, the computing device may switch to interpreting the finger movement as two-dimensional input. Conversely, once a determination is made that the finger movement is two-dimensional, the input is not subsequently interpreted to be one-dimensional.

Methodology

Figure 2:
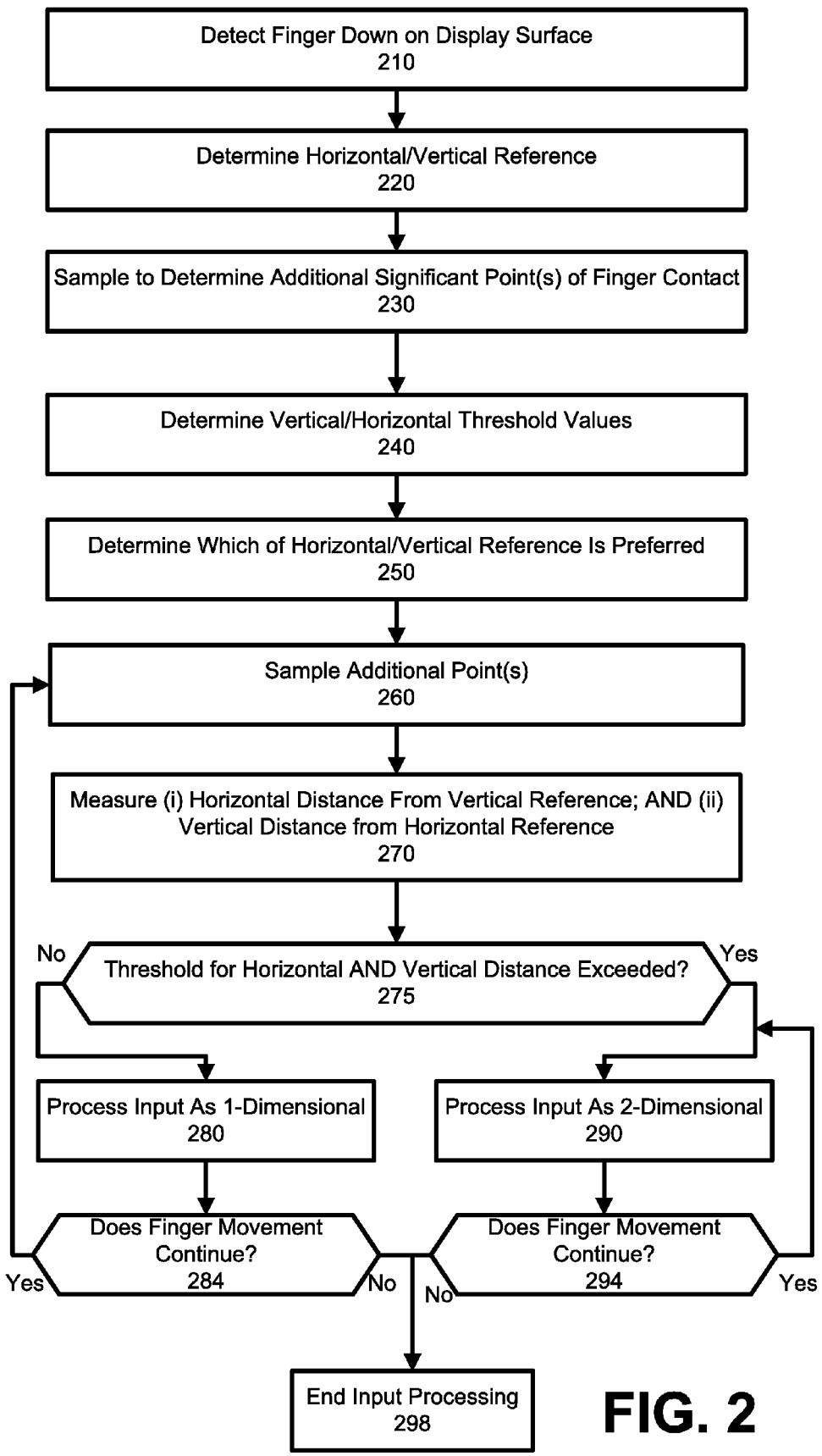
FIG. 2 describes a method by which an input movement of a finger or object is interpreted as a one- or two-dimensional input, under an embodiment.
Figure 3:
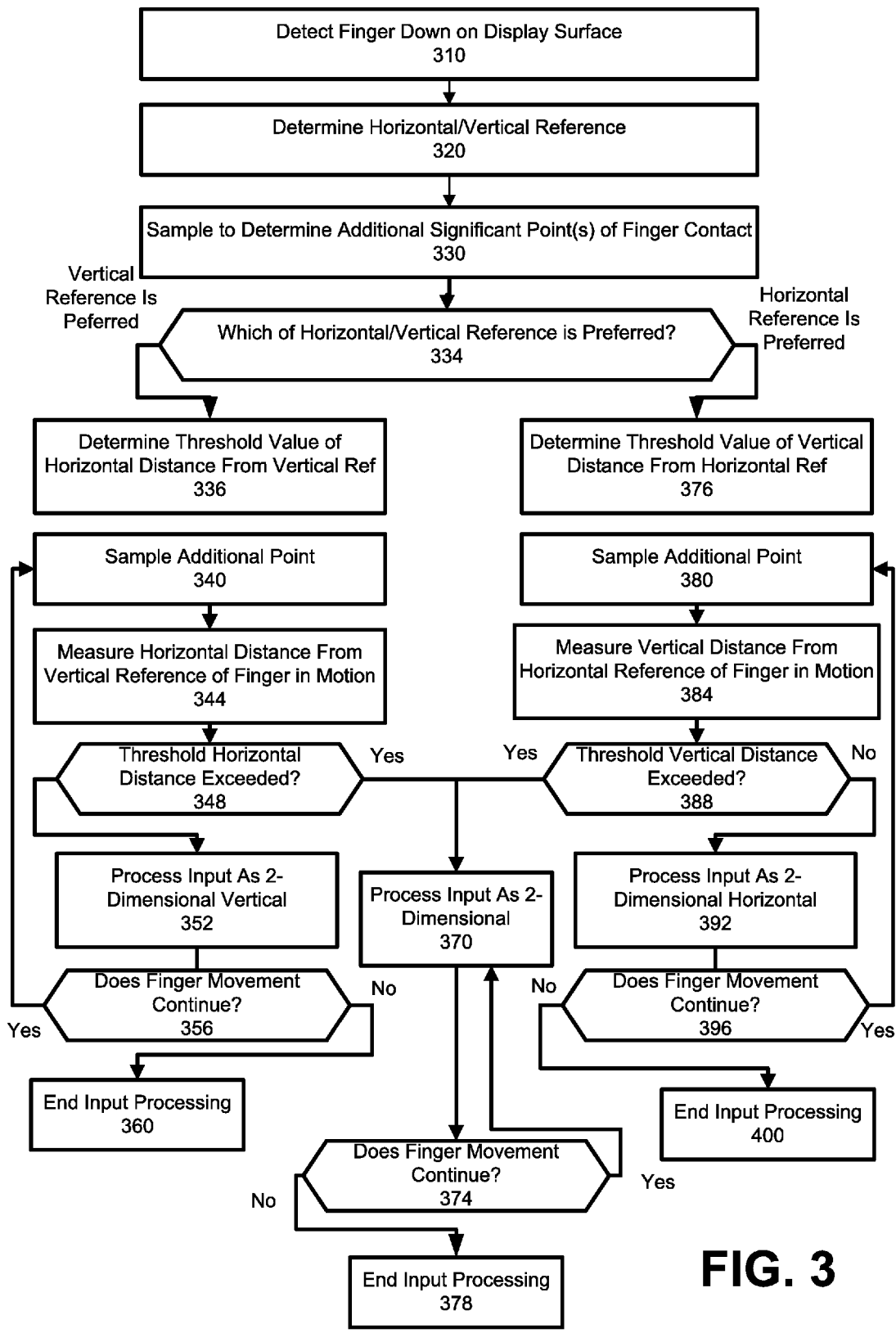
FIG. 3 describes another method by which an input movement of a finger or object is interpreted as a one- or two-dimensional input, under another embodiment.

FIG. 2 and FIG. 3 each describe a method by which an input movement of a finger or object is interpreted as a vertical scroll input, horizontal scroll input, or two-dimensional input movement (e.g. gesture or trace input). A method such as described with FIG. 2 or FIG. 3 may be implemented on a computing device, using hardware and/or components, as described with embodiments of FIG. 6 and FIG. 7.

A user may interact with a computing device by moving a finger over a touch-sensitive display surface (or other touch-sensitive region) of the computing device. Accordingly, step 210 provides that an input movement is detected corresponding to the user moving a finger (or other object) across a display surface. The initial point of contact between the finger and display surface is termed the initial point of finger contact (at time T0).

A horizontal and vertical reference is determined about the initial point of finger contact (step 220). In some implementations, the horizontal/vertical reference as the same orientation as the X, Y axis of the display surface (along the width/length of the display surface), but its origin or center coincides with the location of the finger down.

After the initial point of contact (T0), the user's finger movement is sampled to determine one or more significant points of contact (step 230). A significant point of contact may correspond to the point of contact after T0 that satisfies an initial criterion. The initial criteria may correspond to, for example, (i) the first sampled point after T0; or (ii) the first sampled point after T0 that is separated from T0 by some displacement (e.g. a set number of pixels).

Figure 4:
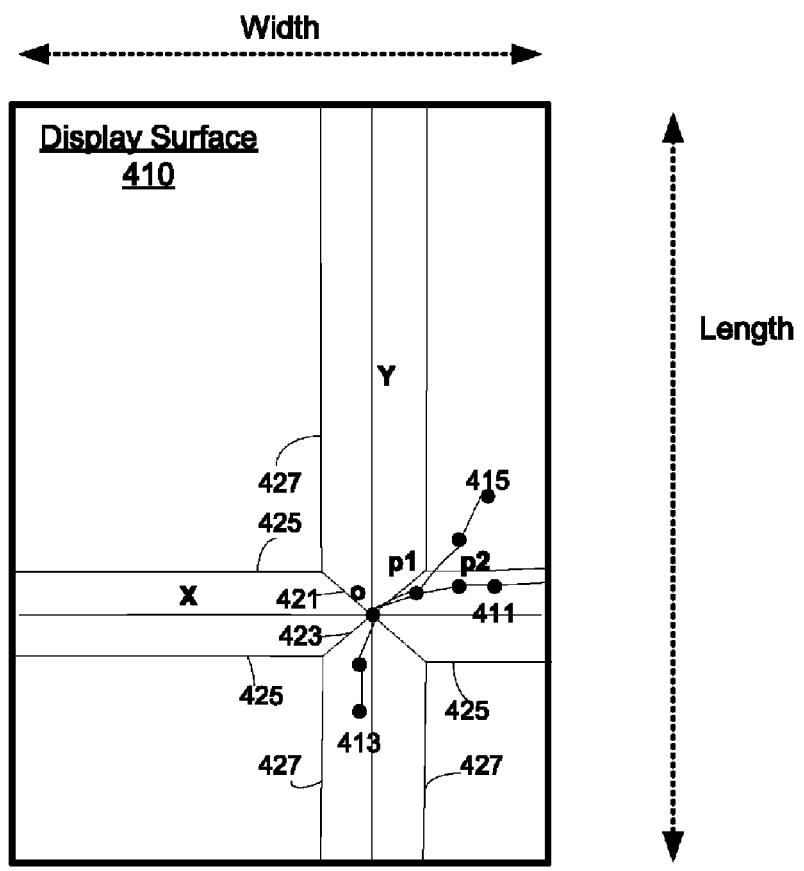
FIG. 4 illustrates implementation of methods such as described with FIG. 2 and FIG. 3, under one or more embodiments.

In an embodiment, vertical and horizontal threshold values are determined for the finger input (step 240). With reference to FIG. 4 (and FIG. 1), the threshold values may be determined as bands 425, 427 that define regions of the topology used to interpret the input. The vertical and horizontal threshold values are used together to determine whether the finger motion is to be subsequently interpreted as one-dimensional (either horizontal or vertical) or two-dimensional.

The significant point of contact is used to determine which of the horizontal or vertical references is preferred for the input motion (step 250). At the significant point, the input is processed as being one of a linear horizontal or linear vertical input.

Additional points are sampled after determining the preference of the horizontal or vertical reference (step 260). For individual points of the sample, threshold calculations are determined with reference to both horizontal and vertical references. Specifically, the threshold horizontal and vertical values are used to determine, for individually sampled points, (i) the horizontal distance of the sampled point from the vertical reference, (ii) the vertical distance of the sampled point from the horizontal reference (step 270). A determination is then made as to whether the thresholds for both of the horizontal and vertical distances have been exceeded (step 275). If both thresholds have not been exceeded (e.g. neither exceeded, or one exceeded but not the other), then the computing device continues to process the input of the finger movement as one dimensional (step 280). More specifically, the input of the finger motion is processed as either linear horizontal or vertical input, depending on the determination of step 250.

If, on the other hand, the thresholds for both of the horizontal and vertical distances have been exceeded, then the computing device switches to processing the input as two-dimensional. As two-dimensional input, the input may be processed as, for example, trace input, drag input, or gesture input.

Following each of step 280, 290, a determination is made as to whether additional finger movement has occurred (step 284, 294). If no further finger movement is detected, the input processing is completed 298. If the sampled point was processed as one-dimensional input, and the determination is that the finger point continues, then step 260 is repeated, where additional point(s) of the finger movement are sampled and processed for determination of linear/two-dimensional input. The horizontal/vertical determination for the linearity remains. If the sampled point was processed as two-dimensional input, and the determination is that the finger point continues, then step 290 is repeated. Thus, no further determination is made as to whether the input of the finger movement is linear or two-dimensional. Once the input is determined to be two-dimensional, the input is deemed two-dimensional until it is over (e.g. finger lifts off).

FIG. 3 illustrates an embodiment that requires only one-dimensional threshold computation to determine whether the input is linear or two-dimensional, at a given instance, under an embodiment. A method such as described with FIG. 3 may include steps such as described with FIG. 1 in order to: (i) detect initial point of contact (T0) by finger contact (step 310); (ii) determine the horizontal and vertical reference about T0 (step 320); (iii) determine one or more significant points of contact (T1 . . . TN) after T0 (step 330).

The significant point(s) of contact are used to make a determination (step 334) as to which of the horizontal/vertical axis is preferred or dominant. In one implementation, if the path between T0 and the significant point of contact is closer to one axis than the other, then the closer axis is the dominant/preferred axis. In some implementations, one reference may be weighted over another, so as to bias the determination to conclude that axis is dominant. The weight may be set by manufacturer criteria, user preference, historical use, sensor information about the finger (e.g. thumb or finger being used) or the orientation of the device. According to an embodiment, the determination of step 334 is one of (i) the vertical reference is preferred (step 340), in which case a determination is made as to whether subsequent sampled points are to be considered vertical linear input or two-dimensional input; or (ii) the horizontal reference is preferred (Step 380), in which case a determination is made as to whether the subsequent sampled points are to be considered horizontal linear input or the two-dimensional input.

If the determination of step 334 is that the vertical reference is preferred/dominant, then the input is initially processed as linear/vertical. The threshold values that correspond to the maximum horizontal separation for a sampled point of the input to be considered linear/vertical are defined (step 336). The significant point of contact is processed as one-dimensional vertical input (step 338). The one-dimensional vertical input may coincide with, for example, a vertical scroll value.

One or more additional points of the user's finger movement are sampled (step 340). At individual sampled points, the horizontal distance is measured from the vertical reference (step 344). The horizontal distance to the vertical reference is then used to determine whether the user's finger motion is to continue to be processed as linear/vertical, or as two-dimensional input. The determination may include comparing the measured horizontal distance to the vertical reference to a threshold value (step 348). If the result of the determination is that the threshold value is not exceeded, then the one or more additional points are continued to be processed as one-dimensional vertical input (step 352). For example, the vertical one-dimensional input values may be analyzed to determine a corresponding scroll value.

After the additional points are processed, another determination is made as to whether the finger movement continues on (step 356). If the finger movement ceases, then input is no longer processed (step 360). If the finger movement continues on, then additional points are sampled (step 340) and the determination is made as to whether the finger movement is be processed as vertical one-dimensional input or two-dimensional input (steps 344, 348).

If the result of the determination in step 348 is that the threshold value is exceeded (when comparing the measured horizontal distance to the vertical reference to a threshold value), then the one or more additional points are processed as two-dimensional input (step 370). As two-dimensional input, the input may be processed as, for example, trace input, drag input, or gesture input. A determination is subsequently made as to whether the finger movement continues (step 374). If the finger movement does not continue, then the processing of the finger movement as input stops (step 378). If the finger movements continue, the additional movements are processed as two-dimensional input. Thus, under some embodiments, once the determination is made that the input is two-dimensional, subsequent input is processed only as two-dimensional input.

If the determination of step 334 is that the horizontal reference is preferred/dominant, then the input is initially processed as linear/horizontal. The threshold values that correspond to the maximum vertical separation for a sampled point of the input to be considered linear/horizontal are defined (step 376). The significant point of contact is processed as one-dimensional horizontal input (step 378). The one-dimensional horizontal input may coincide with, for example, a vertical scroll value. Subsequent steps may mirror those used to when vertical reference is deemed preferred or dominant (steps 340-360). Thus, one or more additional points of the user's finger movement are sampled (step 380). At individual sampled points, the vertical distance is measured from the horizontal reference (step 384). The vertical distance to the horizontal reference is then used to determine whether the user's finger motion is to continue to be processed as linear/horizontal, or as two-dimensional input. The determination may include comparing the measured vertical distance to the horizontal reference to a threshold value (step 388). In some implementations, this threshold value may be the same as that determined for the horizontal distance to the vertical reference (step 348). If the result of the determination is that the threshold value is not exceeded, then the one or more additional points are continued to be processed as one-dimensional horizontal input (step 392). For example, the horizontal one-dimensional input values may be analyzed to determine a corresponding horizontal scroll value. As with vertical input processing, another determination is made as to whether the finger movement continues on (step 396). If the finger movement ceases, then input is no longer processed (step 400). If the finger movement continues on, then additional points are sampled (step 380) and the determination is made as to whether the finger movement is be processed as horizontal one-dimensional input or two-dimensional input (steps 384, 388).

If the result of the determination in step 388 is that the threshold value is exceeded (when comparing the measured vertical distance to the horizontal reference to a threshold value), then the one or more additional points are processed as two-dimensional input (step 170). Steps 370-378 then follow.

IMPLEMENTATION EXAMPLES

FIG. 4 illustrates implementation of methods such as described with FIG. 2 and FIG. 3, under one or more embodiments. In FIG. 4, a topology is defined on, for example a display surface 410 (or other input interface) that receives a finger movement 411, 413, 415 as input. Each finger movement 411, 413, 415 is depicted as initiating at an initial point (O), which can be somewhere on the display surface. The horizontal and vertical references X, Y pass through O. In some embodiments, the orientation of the horizontal and vertical references X, Y coincides with the orientation of the length/width axes of the input interface 410. The horizontal and vertical references X, Y may be determined when the finger movement is first detected (step 220 of FIG. 2.; step 320 of FIG. 3). The topology may comprise the horizontal/vertical references X, Y, the reference comparison lines 421, 423, and the horizontal/vertical tolerance bands. The horizontal and vertical band lines 425, 427 may coincide with the determined threshold values (step 240 of FIG. 2; steps 336 or 376 of FIG. 3)

With reference to the finger movement 411, the methodologies described with each of FIG. 2 and FIG. 3 are illustrated. The significant point P corresponds to the first point in time that is a threshold distance (as measured by pixels) from O. P is used to determine which is dominant for input movement 411: X or Y (step 240 of FIG. 2; step 334 of FIG. 3). Subsequent points P1, P2 are sampled. In an embodiment described with FIG. 2 and FIG. 3, the movement 411 is deemed linear because the vertical distance from the horizontal reference (X) is deemed less than the threshold of the band 425 (step 270 of FIG. 2; step 384 of FIG. 3).

Similarly, with alternative movement 413, the movement is deemed linear because the horizontal distance from the vertical reference (Y) is deemed less than the threshold band 427. Movement 415, on the other hand, includes a sample point Pi that is deemed two-dimensional. In an embodiment of FIG. 2, both of the (i) horizontal distance to the vertical reference Y, and (ii) the vertical distance to the horizontal reference X, exceed the threshold as defined by the bands 425, 427.

In comparison, an embodiment such as described with FIG. 2 may carry additional computational expense (as compared to FIG. 3) in that a "point-in-rectangle" calculation is needed to make determinations at each sampled point of the input movement. Moreover, the results of an embodiment of FIG. 2 do not necessarily match that of FIG. 3. For example, an input movement may start linear along one of the axis (e.g. X), then quickly switch to move along the other axis (e.g. Y) without ever having both horizontal/vertical distance thresholds being exceeded. Under an embodiment of FIG. 2, the input would be interpreted as being linear in a direction of the X axis. Under an embodiment of FIG. 3, the input would be interpreted as being two-dimensional after the movement switches direction.

Numerous variations to embodiments described in this application may be implemented. In particular, the topology depicted with, for example, FIG. 1 and FIG. 4 may be configured or varied based on various parameters. The aspects of the topology that may be varied include the horizontal/vertical references X, Y, the reference comparison lines 421, 423, and the horizontal/vertical tolerance bands. According to various embodiments, each of the aspects of the topology (and how finger movement is determined as one- or two-dimensional) are configurable by parameters that include: a user-preference parameter; parameters indicating the orientation of the device with respect to the user's finger or input mechanism; parameters indicating whether the user is using a thumb or other finger; historical parameters.

As more specific parameters, a user may set a preference to favor, for example, the device to interpret finger motions as scrolling or other linear input. In such case, the bands 425, 427 may be widened to increase the tolerance by which the finger movement can be considered twp-dimensional.

A sensor (or sensors) indicating the orientation of the device may be used to skew the horizontal/vertical references to match, for example, an orientation of how the user may hold or operate a device when entering the input. Likewise, a sensor may be used to detect when the user is using his thumb on the display surface. The sensors may sense, for example, the presence of a hand gripping the device (so as to infer the thumb being used on the display). As another example, the sensor may use imaging to capture which finger the user utilizes. When the thumb is present, the following provide examples of how the topology can optionally be modified: (i) skew horizontal/vertical reference X, Y to accommodate presumed curvilinear motion of thumb when entering movement over touch-sensitive screen; (ii) widen or skew bands 425, 427 to reflect increase in tolerance values from which two-dimensional input is inferred.

Historical information may be used to determine, for example, likelihood of the device's orientation when in use, or the propensity of the user to enter or want to enter linear or two-dimensional input.

Numerous other variations are possible and encompassed by embodiments described.

Velocity Based Interpretation of Input Movement

Still further, an embodiment enables a computing device to interpret a user's input movement of a finger or object as one- or two-dimensional input based on a velocity determination of the input movement. Such an embodiment may be based on an assumption that a user's one-dimensional input (e.g. scrolling) is likely to be faster than the user's two-dimensional input.

Figure 5:
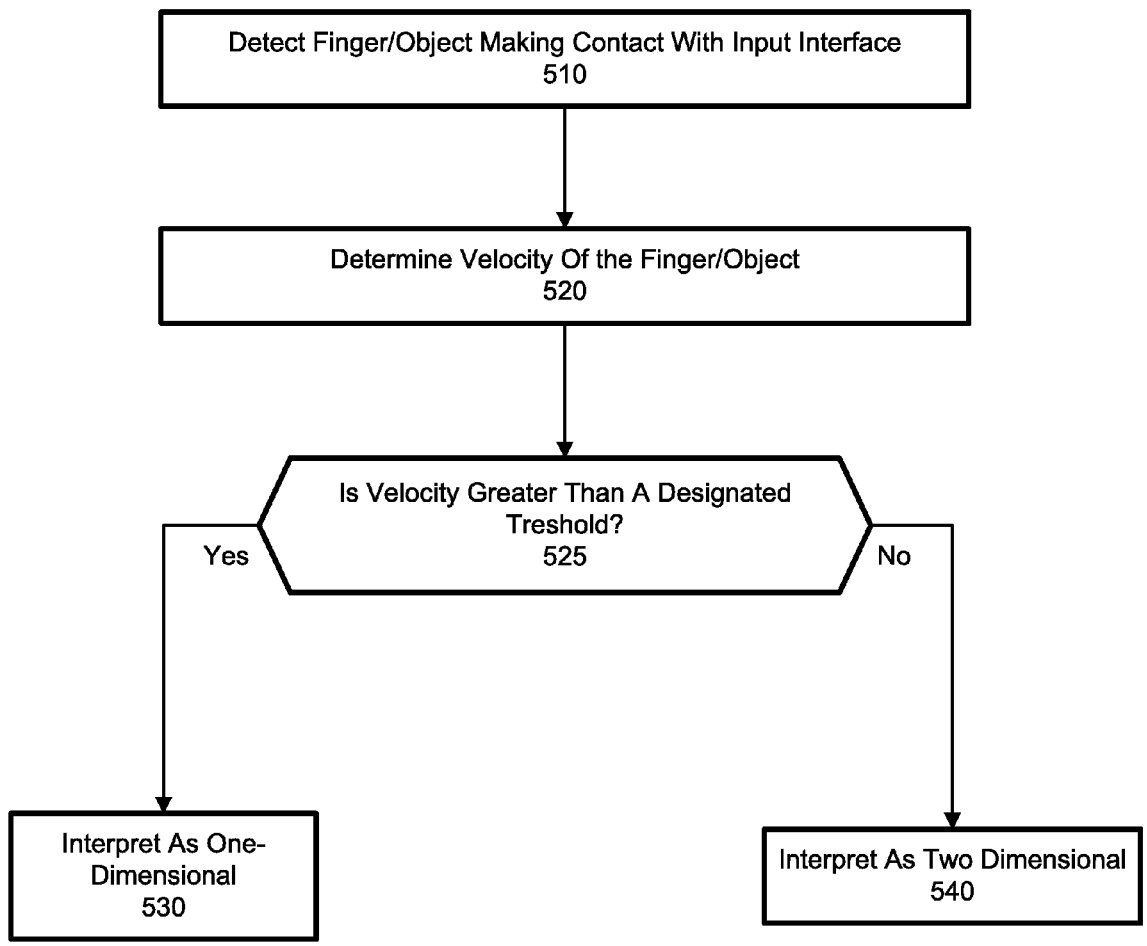
FIG. 5 illustrates a method for interpreting an input movement of a user's finger or object based on the movement's velocity, under another embodiment.

FIG. 5 illustrates a method for interpreting an input movement of a user's finger or object based on the movement's velocity, under an embodiment. In step 510, the computing device detects the user's finger or object making contact with the input interface. As described with some other embodiments, the input interface may correspond to a display interface.

On contact, the user may move the finger or object in a particular direction. Step 520 provides that the velocity of the user's finger or object being moved is calculated. For example, the position of the user's finger or object is determined at several instances in rapid succession. At the same time, a timer is initiated at a designated instance when (or shortly after) the user first places his finger or object on the input interface. The position information and the time in which the finger/object moves to the individual positions used to determine the velocity of the finger/object. The velocity determination may be based on multiple sampled points (e.g. average, weighted average), or on one or more individual sampled points (e.g. the last sampled point just before the user lifts his finger).

A determination is made in step 525 as to whether the input movement is one- or two-dimensional. This determination may be made by comparing the velocity determination of step 520 with a threshold level that indicates whether the input motion is one- or two-dimensional.

If the determination is that the velocity is greater than the designated threshold, then step 530 provides that the input movement is interpreted as a linear or one-dimensional input movement. As described with some other embodiments, the device may lock into interpreting the input as one-dimensionally subsequent to making the determination. Otherwise, if the determination is that the velocity is less than the designated threshold, then step 540 provides that the input movement is interpreted as a two-dimensional input movement.

Numerous variations are possible with an embodiment such as described with FIG. 5. For example, the computing device may switch from interpreting a user's input movement as being one-dimensional to interpreting the user's input movement as being two-dimensional if the user's finger slows down while remaining in contact with the input interface. Likewise, the device may switch (or switch back) from interpreting the user's input movement as being two-dimensional to interpreting the user's input movement as being one-dimensional when the velocity of the user's input movement slows down to be below the designated threshold.

Device Description

Figure 6:
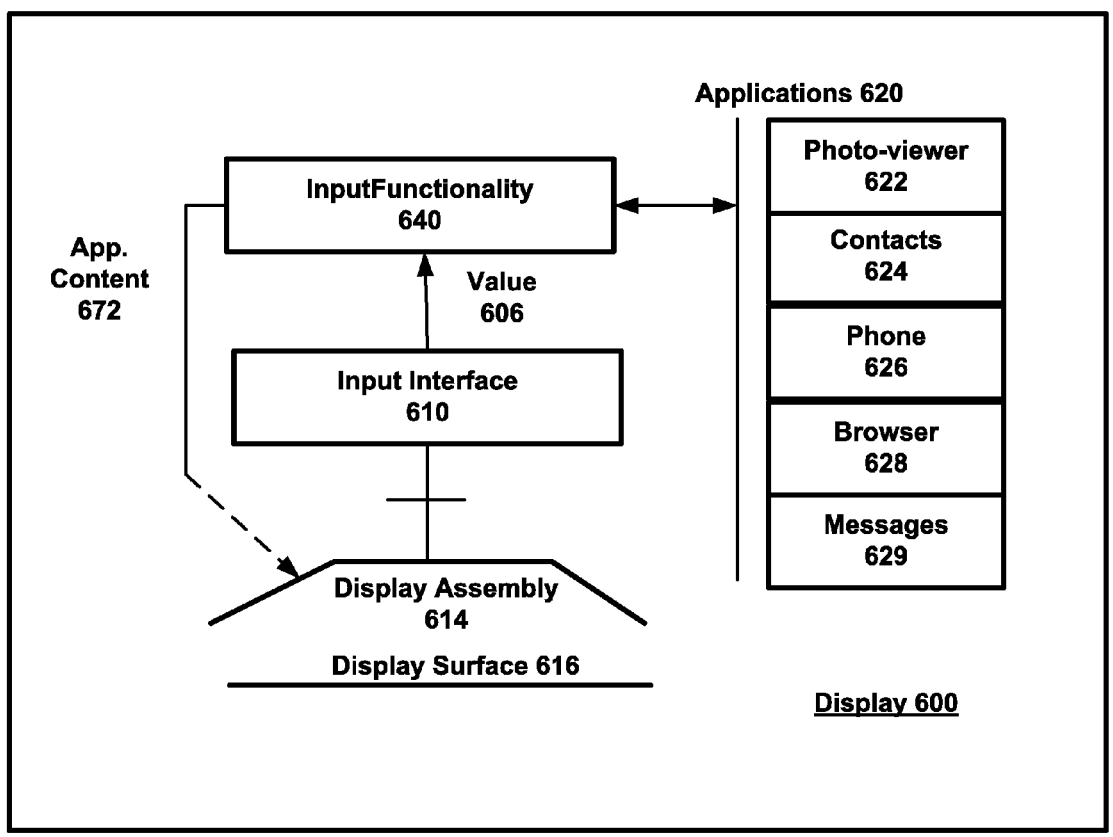
FIG. 6 illustrates a computing device configured to implement one or more embodiments described herein.

FIG. 6 illustrates a computing device configured to implement one or more embodiments described herein. The computing device 600 may correspond to, for example, a mobile computing device such as described with FIG. 8 and elsewhere in this application. According to an embodiment, the computing device 600 includes input interface 610 for receiving input corresponding to a user moving a finger or object over an input interface. In one embodiment, the input interface 610 corresponds to a contact or touch-sensitive display screen. Other input interfaces correspond to, for example, touch-pads. As described with FIG. 8, the input interface 610 is combined or integrated with a display assembly 614 that provides a display surface 616 for enabling output.

The device 600 is enabled to execute any one of many applications, including applications that receive and respond to scroll input (or other directional input), gestures, and/or trace inputs. There are numerous applications that receive scroll input to enable content generated from the application to be moved in one direction or another. Such applications may also be enabled to receive gestures to move a viewing perspective (or content) in two-dimensions. The following provides some examples of applications that can execute to use scroll (or directional) input in a particular manner. A photo viewer 622, for example, may receive directional input (i.e. scroll input) to enable the user to scan sets of images in a linear direction, or to scan through the contents of an image in a linear direction. The photo viewer 622 may also receive gesture input to enable the user to zoom and move the viewing perspective when viewing regions of the image. Numerous other applications may operate applications that similarly or capable of receiving and responding to one-dimensional and/or two-dimensional inputs. Other examples of such applications include a contact application 624 that displays and provides contact records, a phone application 626 to enable telephony, browser 628 (or document viewer) to enable web browsing, and a messaging application 629 (e.g. email, SMS, MMS, IM, integrated messaging platform etc.) to render messages and enable message composition. Numerous other applications may alternatively be employed to handle one dimensional directional inputs (scrolling) as well as two-dimensional inputs.

According to an embodiment, input functionality 640 is included or otherwise integrated with the individual applications 620 to enable the user to enter scrolling or gesture inputs. In one embodiment, the input functionality 640 is made available as part of a functional operating system library, for use with applications that execute on the device. One or more embodiments provide that the input functionality 640 includes logic that (i) detects the user placing a finger or object on the input interface to enter input, (ii) subsequently makes a determination as to whether the user's input movement is one- or two-dimensional (e.g. gesture input), then interprets the user's input movement accordingly. Application content 662 reflecting the user's input actions may be returned to the display surface 616 as part of the user's interaction with the device.

Figure 7:
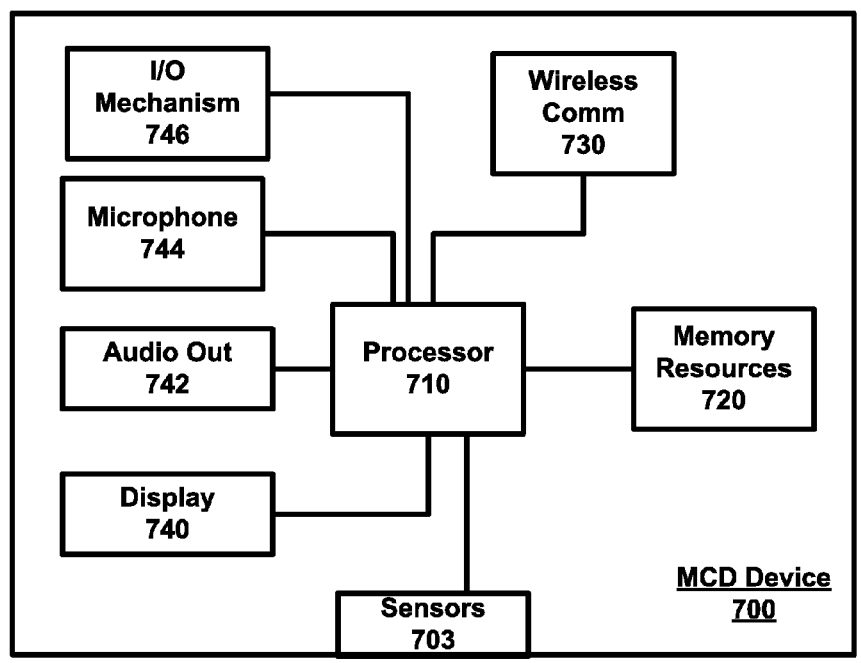
FIG. 7 illustrates a hardware diagram for a computing device that is configured to support any of the embodiments described herein.

FIG. 7 illustrates a hardware diagram for a computing device that is configured to support any of the embodiments described herein. An embodiment of FIG. 7 is depicted as a mobile computing device 800, which may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen (which may optionally be contact-sensitive) on one façade. The button panel region may occupy a band between the keypad and the display area, and include a navigation button and multiple application buttons or action buttons.

Specific types of messaging that may be performed includes messaging for email applications, Short Message Service (SMS) messages, Multimedia Message Service (MMS) messages, and proprietary voice exchange applications (such as SKYPE). Still further, other types of computing device contemplated with embodiments described herein include laptop or notebook computers, ultra-mobile computers, personal digital assistants, and other multi-functional computing devices.

Still further, one or more embodiments may be implemented through any type of computing device is a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

According to an embodiment, the device 800 may include one or more processors 710 (as processing resources), memory resources 720, one or more wireless communication ports 830, and various other input/output features, including a display assembly 740, a speaker 742, a microphone 744 and other input/output mechanisms 746. The display assembly 740 may be contact-sensitive (to detect presence of objects), and more specifically, touch-sensitive, to detect presence of human skin (such as the motion of a finger). According to some embodiments, the display assembly 740 provides the interface by which the user may enter input movements to interact with applications and application content. As described with prior embodiments, the processor(s) 710 are configured to interpret input movements as either one- or two-dimensional inputs, corresponding to, for example, scrolling actions or gesturing/tracing. The processor(s) 710 may be configured to implement processes such as described with, for example, FIG. 2, FIG. 3 and FIG. 7.

In some embodiments, the device 700 includes one or more sensors 703 (or other mechanisms) to detect one of more of (i) an orientation of the device when in use (relative to the user), (ii) whether the user is using a thumb or other finger in entering input. Orientation information determined from the one or more sensors may be used to skew or otherwise alter the topology for determining whether the input movement is one/two-dimensional input. Likewise, a topology such as described with previous embodiments may be skewed to accommodate the particular finger that the user is using. For example, a user's thumb may have a propensity to curve when creating input movement, and the topology may be skewed to bias the interpretation as linear input.

It is contemplated for embodiments described herein to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
   a touch-sensitive display screen;
   one or more processors coupled to the touch-sensitive display screen, the one or more processors to:
   detect a movement of a user's finger or object on a surface of the touch-sensitive display screen;
   determine a plurality of points in the movement, the plurality of points including at least an initial point of the movement;
   determine a vertical band and a horizontal band based on the initial point of the movement, the vertical band being defined by a horizontal threshold value a distance away from a horizontal reference of the initial point, and the horizontal band being defined by a vertical threshold value a distance away from a vertical reference of the initial point; and
   determine the movement as being a one-dimensional input or a two-dimensional input based on whether at least one point of the plurality of points is located outside both the vertical band and the horizontal band.

2. The computing device of claim 1, wherein the one or more processors determine the movement as being a one-dimensional input or a two-dimensional input by (i) measuring a horizontal distance of each of the plurality of points from the vertical reference and a vertical distance of each of the plurality of points from the horizontal reference, and (ii) comparing the measured horizontal distances and the vertical distances with the horizontal threshold value and the vertical threshold value, respectively.

3. The computing device of claim 1, wherein the one or more processors further operates an application to receive the one-dimensional input or the two-dimensional input in order to perform an action on the application.

4. The computing device of claim 1, wherein the plurality of points in the movement includes a significant point, the significant point satisfying a criterion based on at least one of time elapsed or distance from the initial point.

5. The computing device of claim 4, wherein the one or more processors further determines a direction of the movement based on the significant point.

6. A method for determining an input for operating a computing device, the method being performed by one or more processors and comprising:
   detecting a movement of a user's finger or object on a surface of a touch-sensitive display screen;
   determining a plurality of points in the movement, the plurality of points including at least an initial point of the movement;
   determining a vertical band and a horizontal band based on the initial point of the movement, the vertical band being defined by a horizontal threshold value a distance away from a horizontal reference of the initial point and the horizontal band being defined by a vertical threshold value a distance away from a vertical reference of the initial point; and
   determining the movement as being a one-dimensional input or a two-dimensional input based on whether at least one point of the plurality of points is located outside both the vertical band and the horizontal band.

7. The method of claim 6, wherein determining the movement as being a one-dimensional input or a two-dimensional input includes (i) measuring a horizontal distance of each of the plurality of points from the vertical reference and a vertical distance of each of the plurality of points from the horizontal reference, and (ii) comparing the measured horizontal distances and the vertical distances with the horizontal threshold value and the vertical threshold value, respectively.

8. The method of claim 6, further comprising operating an application to receive the one-dimensional input or the two-dimensional input in order to perform an action on the application.

9. The method of claim 6, wherein the plurality of points in the movement includes a significant point, the significant point satisfying a criterion based on at least one of time elapsed or distance from the initial point.

10. The method of claim 9, further comprising determining a direction of the movement based on the significant point.

11. A non-transitory computer readable medium storing instructions that, when executed by one or more processors, causes the one or more processors to perform steps comprising:
    detecting a movement of a user's finger or object on a surface of a touch-sensitive display screen;
    determining a plurality of points in the movement, the plurality of points including at least an initial point of the movement;
    determining a vertical band and a horizontal band based on the initial point of the movement, the vertical band being defined by a horizontal threshold value a distance away from a horizontal reference of the initial point and the horizontal band being defined by a vertical threshold value a distance away from a vertical reference of the initial point; and
    determining the movement as being a one-dimensional input or a two-dimensional input based on whether at least one point of the plurality of points is located outside both the vertical band and the horizontal band.

12. The non-transitory computer readable medium of claim 11, wherein the instructions cause the one or more processors to determine the movement as being a one-dimensional input or a two-dimensional input by (i) measuring a horizontal distance of each of the plurality of points from the vertical reference and a vertical distance of each of the plurality of points from the horizontal reference, and (ii) comparing the measured horizontal distances and the vertical distances with the horizontal threshold value and the vertical threshold value, respectively.

13. The non-transitory computer readable medium of claim 11, wherein the instructions further cause the one or more processors to operate an application to receive the one-dimensional input or the two-dimensional input in order to perform an action on the application.

14. The non-transitory computer readable medium of claim 11, wherein the plurality of points in the movement includes a significant point, the significant point satisfying a criterion based on at least one of time elapsed or distance from the initial point.

15. The non-transitory computer readable medium of claim 14, wherein the instructions further cause the one or more processors to determine a direction of the movement based on the significant point.

* * * * *